July 17, 1951     S. M. NAGOURNEY     2,560,884
CAMERA STAND FOR MEDICAL PHOTOGRAPHY
Filed March 8, 1948     3 Sheets-Sheet 1
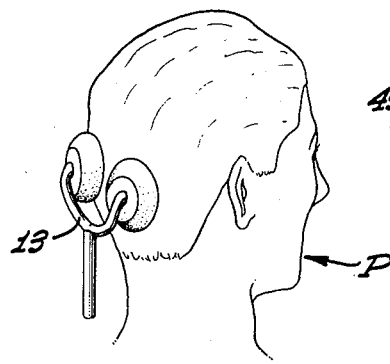
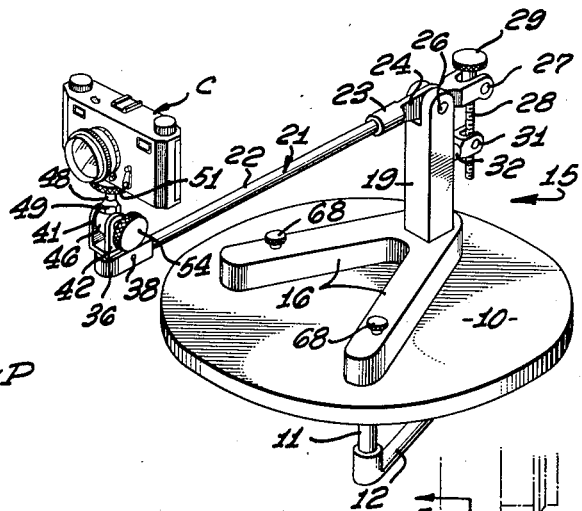
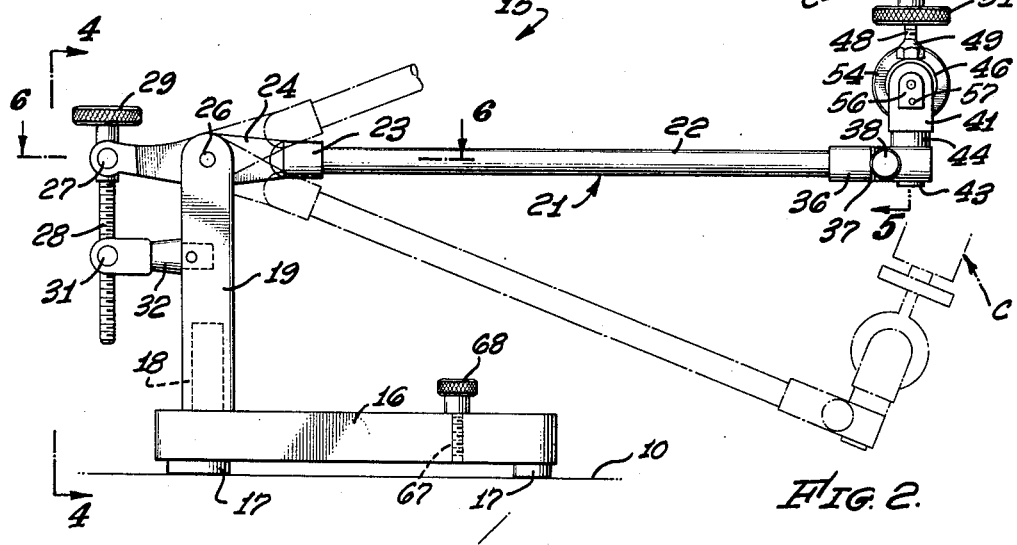
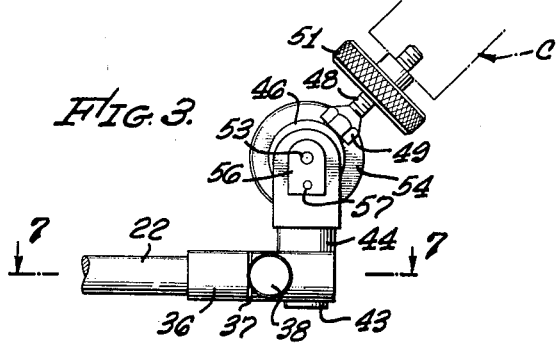
SAMUEL M. NAGOURNEY
INVENTOR.
BY
ATTORNEY.

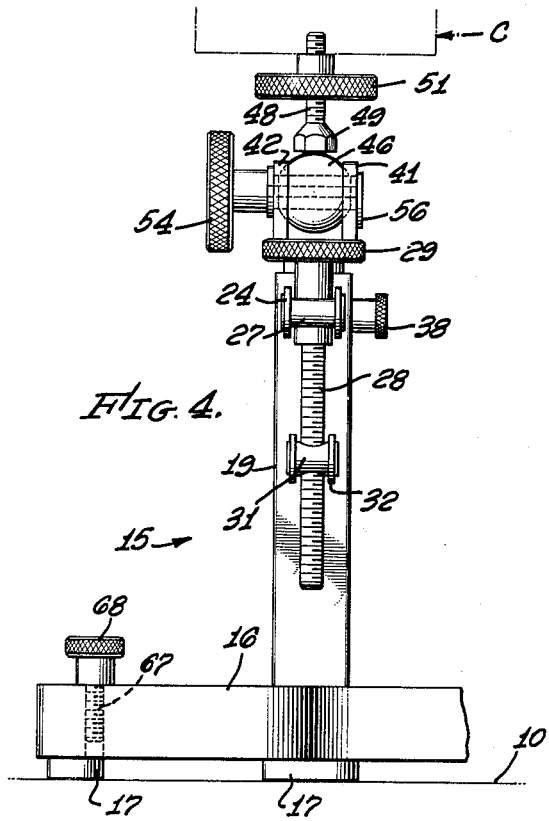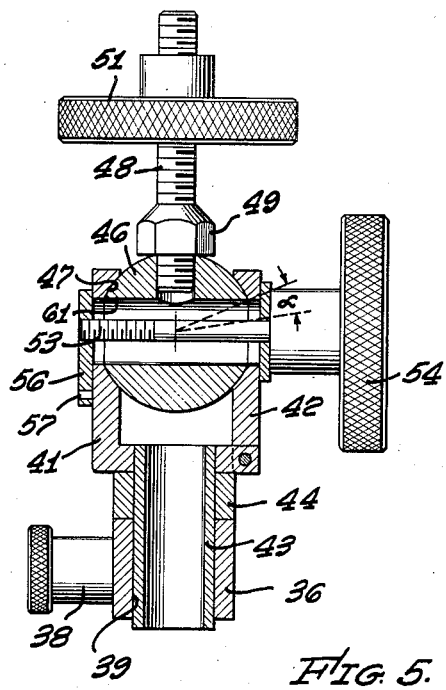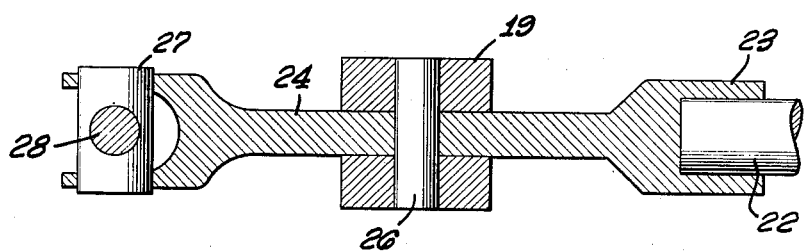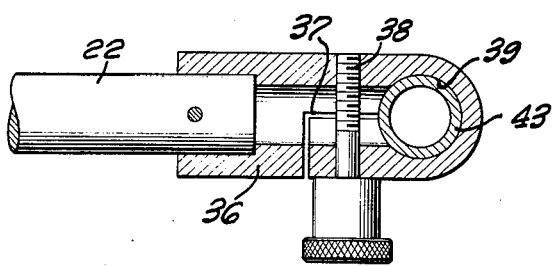

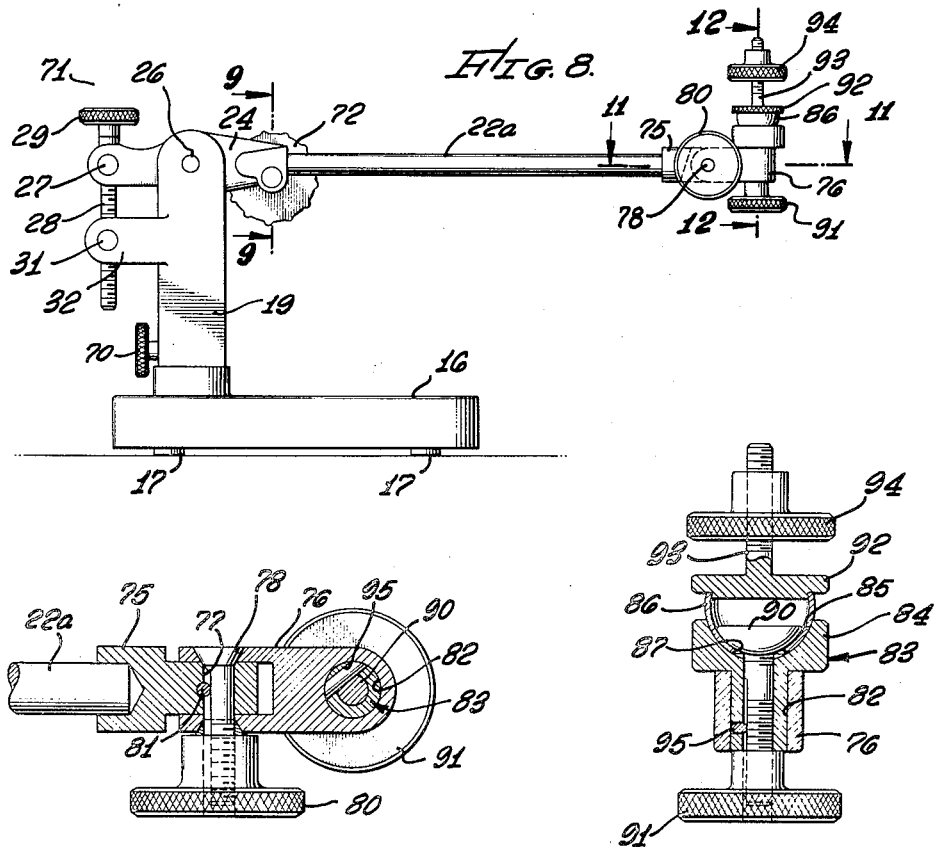
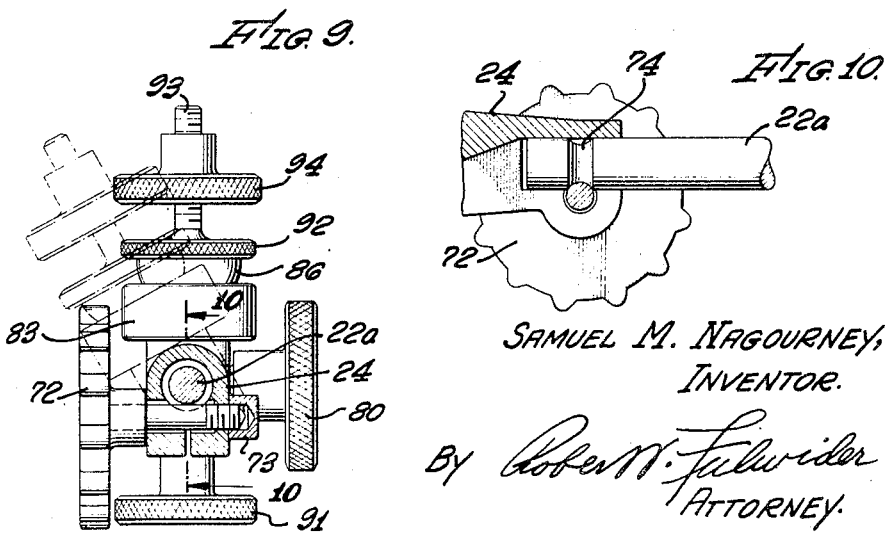

Patented July 17, 1951

2,560,884

UNITED STATES PATENT OFFICE 2,560,884

CAMERA STAND FOR MEDICAL PHOTOGRAPHY

Samuel M. Nagourney, Los Angeles, Calif.

Application March 8, 1948, Serial No. 13,614

7 Claims. (Cl. 248—124)

1

The present invention relates to an adjustable mounting for cameras, particularly useful in medical photography, and more specifically to a a portable adjustable stand of the type adapted to be placed upon a tray of the type usually found in a dentist's office and to support thereon adjustably a camera that it may record photographically the teeth of a patient seated in the dentist's chair.

The use of photography in the field of medicine, surgery and dentistry has become widespread. Nowhere is it used to better advantage than in the field of dentistry, and particularly in orthodontia in which permanent visual records of the changes brought about in the dental structure are highly important. As distinguished from X-ray pictures which are usually taken by specialists using special equipment, dental photographs are usually taken by the dentist with his patient seated in the dental chair. The tooth structure to be photographed may be in either the upper or lower jaw and, as the patient may be tall or short, it follows that the recording camera must be adaptable to a plurality of positions.

It is possible, of course, for the dentist to support the camera manually in position relative to the patient but as the slightest movement is sufficient under the circumstances of close range work to blur the negative the pictures so obtained are frequently unsatisfactory. Accordingly, and it is to this field that the present invention relates, adjustable stands or supports have been provided by which the camera is movably mounted as to enable it to be positioned operatively under a wide range of conditions.

It is an object of the present invention to provide new and novel supporting means for a camera particularly useful in medical photography.

It is another object of the invention to provide an adjustable camera stand adapted to position a camera within a relatively wide range of vertical and angular adjustments.

A further object of the invention is to provide an adjustable camera stand adapted to be positioned upon the usual tray present in a dentist's office and to support a camera for vertical and angular adjustment at a distance therefrom.

Still another object of the invention is to provide a portable stand, including manually adjustable means, by which a camera can be adjusted to fixed positions about a plurality of spaced axes.

These and other more specific objects will appear upon reading the following specification and claims and upon considering in connection

2 therewith the attached drawings to which they relate.

Referring now to the drawings:

Figure 1 is a perspective showing of an optional form of an adjustable camera mounting constructed in accordance with the present invention;

Figure 2 is a side elevational view thereof;

Figure 3 is an enlargement of the camera carrying end of the stand;

Figure 4 is a view looking in the direction of the arrows upon the line 4—4 of Figure 2;

Figure 5 is an enlarged section upon the line 5—5 of Figure 2 and illustrates the mounting of the camera at the end of the lateral supporting arm;

Figure 6 is a section upon the line 6—6 of Figure 2;

Figure 7 is an enlarged section upon the line 7—7 of Figure 3 and illustrates the split double socket which supports the camera for adjustment about an axis perpendicular to the laterally extending arm by which it is carried.

Figure 8 is a side elevational view of a preferred form of stand having greater flexibility of adjustment;

Figure 9 is a sectional view taken at 9—9 in Figure 8 to show the mounting of the arm and the adjustability of the camera mount;

Figure 10 is a view taken at 10—10 in Figure 9, showing the method of locking the arm in its support;

Figure 11 is a horizontal sectional view taken at 11—11 in Figure 8; and

Figure 12 is a view taken at 12—12 in Figure 8, showing my new camera mount construction to clearly indicate its adjustable features.

Referring to the drawings and particularly to Figs. 1 through 7, a circular tray 10 is shown mounted on a post 11 at the outer end of the swinging arm 12 suitably supported, in a manner forming no part of the present invention, for pivotal movement about a vertical axis. The tray 10 in the usual dentist's office is positioned closely adjacent the dental chair and is used by the dentist as a resting surface for the various tools used in his work. The head of a patient P is shown in Figure 1 positioned with approximate accuracy relative to the tray 10, his head resting against a head rest 13 carried by the unshown chair upon which he is seated.

In the use of a camera and the adjustable stand constructed in accordance with the present invention, indicated generally by the reference character 15, the dental tray 10 is preferably cleared of tools. The camera, which must be positioned operatively relative to the patient, is indicated generally by the reference character C, and the stand or construction which makes possible the vertical and angular adjustment of this camera will now be described in detail.

Referring again to the drawings, the stand is seen to comprise a base formed of two angularly related feet 16 extended parallel to the surface of tray 10 and preferably spaced therefrom by spacing elements 17 which, if desired, may be formed of non-abrasive material which will not scratch or mar the tray surface. A vertical pin 18 extends upwardly at the junction of feet 16 of the base into a bore or seat in the lower end of a vertical post 19. The pin engages the post frictionally and the two can be parted only by the application of a definite and sufficient separating force. A lever of the first kind is indicated generally by the reference character 21 and comprises a bar 22, the inner end of which seats fixedly in a socket 23 formed at one end of the centrally pivoted member 24 extending between and pivotally mounted upon a pivot pin 26 carried by the bifurcated upper end of post 19.

To effect the pivotal movement of the supporting arm 21 about its fulcrum 26 member 24 is bifurcated at its rearward extremity where it carries a swiveled seat 27 rotatably carrying a bolt 28 threaded therebelow and provided thereabove with a knurled head 29. The threaded portion of bolt 28 passes downwardly through a threaded trunnion 31 swiveled in the bifurcated end of a laterally extending stub arm 32 fixed to post 19. The rotation of bolt 28 causes it to screw its way through trunnion 31 and in doing so effect the movement of swiveled seat 27 relative thereto, and with the latter the pivoted supporting arm 21 rigid therewith. The rotation of the swivel seat 27 and of the trunnion 31 insure their exact alignment at all angular positions of the supporting arm thereby eliminating any binding action. Other forms of adjustment to control the angular position of the supporting arm 21 could be provided so long as they are characterized by the functional capabilities of the disclosed construction.

The stand base can be selectively positioned upon the supporting tray 10 to bring the camera C closer to or to move it farther from the patient, and the pivotal adjustment of the supporting arm 21 controls its elevation. At any given elevation, however, it may be desirable to direct the axis of the camera lens to the right or to the left, or to incline it upwardly or downwardly. Accordingly, camera C is not rigidly mounted upon the supporting arm 21 but instead is adjustably supported by means which will now be described.

The outer end of pivoted supporting arm 21 fixedly carries a double socket member 36, split at its outer end at 37 and carrying a manually adjustable headed bolt or pin 38 extended thereacross and threadedly connected at its inner end so that upon being turned in one direction it draws the two sides of the socket together. The outer socket or seat of member 36 is indicated by the reference character 39, its axis extending at right angles to bar 22. A U-shaped bracket 41, including a removable side 42, is rotatably mounted in socket 39, its rigid sleeve or post 43 extending downwardly through socket 39, its body position being spaced thereabove by a sleeve washer 44. Loosening member 38 enables bracket 41 to be rotated in any direction about the axis of sleeve 43, but with member 38 tightened to draw together the sides of the member 36 the seat 39 clamps the post 43 and relative movement is positively prevented.

Were it desirable to vary only the horizontal range of the camera lens at the elevation set by the arm 21 the camera could be mounted fixedly to the bracket 41. It is also desirable, however, to be able to tilt the camera so as to direct it upwardly or downwardly, as in taking pictures of the teeth in the upper and lower jaws, respectively. The mounting to make possible this adjustment comprises a spherical ball 46 positioned between the apposed faces of bracket 41 which are interiorly contoured into a conforming seat or socket 47. A threaded post 48 extends upwardly from one side of ball 46 being threaded therein and locked relative thereto by a lock nut 49. The upper end of the post extends threadedly into the underside of the camera and to prevent unintentional displacement of the latter a second manually rotatable lock nut 51 is provided upon the post immediately thereunder.

A tight fit of the ball 46 in its seat 47 could function to retain the camera in any set angular position but manufacturing inaccuracies or wear would produce undesirable looseness to destroy this relationship. Accordingly, it is preferred to provide positive means by which socket 47 can be tightened upon ball 46 to position it fixedly.

To constrict the ball socket 47 by drawing the apposed sides of bracket 41 together there is provided a transversely extending bolt or pin 53 provided a knurled head 54 at its outer end and seated in threaded relationship at its opposite end in a plate 56 pivotally carried by a pin 57 and lying against the side face of bracket 41. To permit the passage of the pin 53 between the sides of the bracket, ball 46 is formed with a transverse bore 61 of considerably larger internal diameter than the external diameter of the pin. The relationship is such that ball 46 may not only rotate through a relatively great or major arc about an axis coincident with the pin but may also be tilted angularly through minor arcs alpha about axes extended angularly to the pin. The possible tilting through an exemplary minor arc $a$ is illustrated most clearly in Figure 5 in which the dotted lines of the angle $a$ indicates the permissible rotation of the ball in one direction about an axis perpendicular to the plane of the drawing until the perimeter of the bore 61 contacts the surface of pin 53.

The foregoing comprises the structural features of greatest interest but reference should also be made to the provision of means to seat a lighting fixture adapted to play light rays upon the patient while being photographed. Specifically these comprise threaded pins 67 extended upwardly from the end portions of the base feet 16 which removably seat manually operable clamping nuts 68. The particular lighting fixture which may be used forms no part of the present invention and may be of any desired form or shape or type so long as it is provided with means adapted to cooperate with one or both pins 67 and their locking nuts 68.

A further feature of interest which has already been touched upon comprises the pin and socket relationship existing between the post 19 and the base carried pin 18. A suitable "stroboscopic" lighting device can be provided which seats directly upon the pin 18 and is itself provided with a similar pin upon which the post 19 may be mounted. Here again the exact construction of the lighting mechanism is not of importance and reference is only made to the fact that the construction is such that such a device can be incorporated if desired.

The operation of the camera mounting unit constructed in accordance with the present invention is believed to be clear from the foregoing. The patient being positioned in the dental chair with his head resting against the rest 13, the camera mounting unit is positioned upon the tray 10 which has been swung on its supporting arm 12 into relatively close proximity to the patient P. The base feet 16 are so located upon the tray that an imaginary line dividing the angle between the feet would extend toward the patient's head. The horizontally extended pivot supporting arm 21 is then raised or lowered, depending upon the height of the patient's head, by the manual rotation of the knurled head 29 of the bolt 28, the direction of rotation determining whether the arm is raised or lowered. The adjustment is continued until the camera is adjusted to the proper relationship to the patient's mouth. If a picture of the lower jaw teeth is to be taken the camera would be at a higher elevation than though a picture of the upper teeth were to be taken.

With the camera C properly positioned vertically the next step is to adjust its angle of tilt so that the axis of the camera lens is directed toward the particular tooth or teeth which it is desired to photograph. This may be done by grasping the camera and exerting a pivoting force resulting in the movement of the supporting ball 46 in its socket 47. If the socket is too tight to permit adjustment the clamping bolt head 54 can be rotated slightly to reduce the pressure and, following adjustment, again tightened. The ball can be rotated through major arc of over 180 degrees about the pin 53 as an axis and can be tilted through an arc of 2 $\alpha$ about axes angularly related to the pins as illustrated in Figure 5.

Under certain circumstances it will be necessary to position the camera at the side of the patient's head rather than directly to the front. It would then be desirable to rotate the camera about an axis normal to the arm 21 so that its lens will face the subject. This adjustment is accomplished by the rotation of the bracket 41, the clamping bolt 38 first being loosened to permit the post 43 to turn.

In Figures 8 through 12 I have shown a preferred form of my device which has features of adjustment not provided by the previously described form and which additionally has an improved means for mounting the camera C. Many of the elements of my preferred form are identical or similar to the corresponding elements of the optional form, and in such cases the same numeral has been used to designate the similar parts. Included in this category is the base 16 preferably having spacing elements 17 with a vertically extending pin 18 (not shown) fitting into the lower end of a vertical post 19. While the connection between the pin and the bore or hole in the post 19 may be such as to hold the post solely by the friction between the pin and the surrounding surface of the wall, I prefer to use a set screw 70 which is threadedly mounted in the post and adapted to bear against the pin 18 to lock the post and securely hold it to the pin. In this way, the post 19 may be interchangeably fitted to a number of different bases with only a minimum of attention being paid to the tightness of fit between the pin 18 and the receiving bore within the post.

At the upper end of the post 19 is a centrally pivoted member 24 similar to that previously described, pivotally mounted upon a pivot pin 26 and having a swivelled seat 27 rotatably carrying a bolt 28. As in the previously described form, the upper end of the bolt 28 is provided with a hand wheel or knurled head 29, the latter preferably having an upwardly extending crank or handle 71 for ease in effecting a rapid adjustment of the angular position of the centrally pivoted member 24. The threaded portion of bolt 28 passes downwardly through a threaded trunnion 31 swivelled in a laterally extending stub arm 32 to post 19 as in the previously described form, and the operation of these elements is identical to that previously discussed.

The forward or outer end of the centrally pivoted member 24 has a socket or rod-receiving aperture therein adapted to hold and secure a bar 22a generally similar to the previously mentioned bar 22, but axially rotatable within the socket of the centrally pivoted member. The end of the socket is split, and a thumb screw 72 extends between the two adjacent portions of the split socket, engaging a nut 73 to permit the socket to be constricted, and thus securely clamping the rod 22a. As indicated, the head of the thumb screw 72 is preferably large, with a knurled or roughened exterior to permit its easy operation. In addition, the shank of the screw 72 is preferably located outwardly from the inner end of the rod 22a, and is offset from the center of the rod a distance less than the radius thereof. Consequently a groove 74 must be formed in the rod to prevent interference between the latter and the shank of the screw. The rod 22a is thus free to rotate about its axis when the socket is loosened, but the rod may not be removed from the socket without the removal of the thumb screw 72 from the centrally pivoted member 24. As indicated in Figure 9, the outer or forward end of the rod 22 may thus be rotated about the axis of the rod 22a to any desired position.

At the forward end of the rod 22a, I mount a pivotal connector comprising a hinge member 75 and a cooperating clevis member 76. A circular hole 77 extends through both of these elements to receive a shaft such as a screw 78. One end of the screw 78 projects beyond the clevis member 76 to receive a knurled thumb nut 80 which cooperates with the screw to clamp the two arms of the clevis together and thereby securely hold the latter to the hinge member 75. To prevent rotation of the screw 78, one side of its shank is cut away as indicated in Figure 11, and a pin 81 or other suitable retaining means is passed through the hinge member 75, extending into the hole 77 to bear against the reduced portion of the shank and thereby prevent rotation of the latter. It will thus be obvious that by loosening the thumb nut 80, the clevis member 76 may be rotated about the axis of the screw 78 to any desired position and held there by tightening the nut. If the customary right-hand threads are used on the screw 78 and nut 80, any tendency of the clevis member 76 to rotate because of a weight or force applied to its free end will cause the nut to be rotated with respect to the screw in such a direction as to tighten the clevis, thereby providing a self-locking arrangement.

At the forward or free end of the clevis member 76, I provide my improved mounting or camera head, best seen in Figure 12. Extending generally vertically through the clevis member 76 in a direction perpendicular to the hole 77, is a bore 82 adapted to receive a flanged sleeve 83. The shank or smaller diameter portion of the sleeve member 83 extends through the clevis member 76, making a very tight fit therewith to prevent its accidental movement with respect thereto. The flange 84 of the flanged sleeve 83 rests upon the upper surface of the clevis member 76, and on its upper surface is provided with a generally spherical shaped recess 85 concentric with the axis of the sleeve 83. The center of curvature of the recess 85 is spaced a considerable distance above the top of the flange 84 so that the recess, while being spherically shaped, is considerably less than a hemisphere.

Mounted in the recess 85 is a generally hemispherical shell 86 whose center of curvature is identical with that of the recess 85, so that the shell may be firmly held to the flange 84 while making contact over substantially the entire area of the recess. Centrally located in the bottom of the shell 86 is an aperture 87, and a spherically headed screw 90 is mounted so that its head is within the shell, and its shank extends outwardly through the aperture 87 and through the flanged sleeve 83. The lower end of the screw 90 is engaged by a correspondingly threaded thumb nut 91 which bears against the sleeve 83 so that by tightening the nut, the screw 90 has its head pressed against the shell 86 to force the latter against the recess 85 and thereby prevent any movement of the shell with respect to the recess.

At the upper or open end of the shell 86, I mount a circular plate 92 which is substantially concentric with the center of curvature of the shell, and attach the plate to the shell as by spinning, welding, or any other suitable manner to provide a firm and permanent connection. Extending upwardly from the plate is a threaded post 93 adapted to be received in the tripod receiving socket of the camera C, and a lock nut 94 is mounted on the post to lock the camera to the latter, in the well known conventional manner. To prevent the rotation of the screw 90, a pin 95 is mounted in the flanged sleeve 83 in such a manner as to extend partially through the central opening thereof. The shank of the screw 90 is flattened along one side to receive the pin 95, thus preventing the rotation of the shank and of the head, while permitting free axial movement of the screw. That portion of the head of the screw 90 which bears against the shell 86 is preferably provided with a spherical shape having the same center of curvature as the adjacent face of the shell, in order that the contact area between the head and the shell will be as large as possible.

In use, the camera C is mounted upon the post 93, the latter preferably being loosened by loosening the nut 91, so that the shell 86 and post may be freely rotated to insert the threaded end of the latter into the corresponding socket of the camera. For this purpose, the plate 92 is preferably made slightly larger than the diameter of the shell 86 and has its outer edge knurled to permit its being firmly grasped to insert the post within the camera socket. After the camera C is attached, the locking nut 94 is rotated to a position where it bears against the base of the well socket, locking the camera to the post in the well known maner. The thumb nut 91 may then be tightened to hold the camera in position, and the knob 29 then rotated to raise or lower the camera to the proper position. By releasing the screw 72, the rod 22a may be rotated about its axis to permit the taking of vertical or horizontally framed pictures, the screw being tightened when the desired position is achieved. Any levelling of the camera C required by the angular position of the rod 22a may be effected by loosening the thumb nut 89 and pivoting the clevis member 76 with respect to the hinge member 75. Upon tightening the thumb nut 80, the camera will be retained in its position because of the friction between the clevis and the hinge member 75, and also because of the self-locking effect previously mentioned. Finally, the thumb nut 91 may be loosened to permit the universal movement of the post 93 so that any final and delicate adjustments of the camera position may be secured.

The various adjustments possible about spaced axes provides a flexibility permitting the taking of pictures under a wide range of conditions.

The adjustments are easily made and once made are retained until intentionally altered. The base construction and the angular relationship of the laterally extending arm relative thereto provides stability and enables the camera to be supported at a distance without danger of tipping.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a camera supporting stand of the type including a laterally extended supporting arm at the end of which are positioned means to support a camera for limited universal movement, a base adapted to rest upon a supporting surface, a post extended vertically from said base and pivotally supporting said arm intermediate the ends of the latter, spaced trunnions upon said arm and post, and a draw bolt extended between said trunnions in threaded relationship with at least one of them and adapted upon being rotated to draw said trunnions toward each other, or to move them from each other, to effect the pivotal movement of said arm.

2. A camera supporting stand adapted to support a laterally spaced camera comprising a base having angularly related feet adapted to rest upon a supporting surface, an upwardly extended support positioned at the junction of said feet, a lever of the first kind pivotally mounted on said support and extended forwardly between said feet and therebeyond, manually adjustable means to control the angular position of said lever relative to said support comprising a threaded bolt freely rotatable in and longitudinally fixed in a swiveled seat on said lever and threadedly connected to a second seat carried by said support, and means to support a camera on said lever at a distance from said support including relatively movable means rotatable about axes perpendicular to said lever and to each other.

3. A camera stand of the class described which includes: a base; a generally horizontal arm pivotally connected to said base; a socket member attached to said arm, having a generally spherical recess therein, and a concentric hole extending from said recess through said member; a generally hemispherical shell mounted in said recess, with a camera attaching post connected thereto; a pin having a head within said shell, and a shank extending therefrom, through said concentric hole; and tightening means operable to tension said pin and thereby force said shell against said recess to clamp said shell and hold it against movement.

4. A camera stand of the class described which includes: a base; an upwardly extending post mounted on said base; a socket member pivotally attached to said post for movement about a generally horizontal axis; an arm mounted in said socket for rotation about its axis; clamping means attached to said socket, operable to hold said arm against said rotation; a hinge member attached to the free end of said arm; a clevis member cooperating with said hinge member for rotation with respect thereto and having a generally spherical socket therein; a second clamping means operable to hold said clevis member against rotation with respect to said hinge member; a ball-shaped member having a camera attaching post connected thereto and cooperating with said socket to form a universal joint; and a third clamping means operable to hold said ball-shaped member against movement with respect to said socket.

5. An adjustable holder which includes: a supporting member having a generally spherical recess therein and a concentric hole extending therefrom, through said member; a generally hemispherical shell mounted in said recess, having a central opening therein extending from the exterior to the hollow interior of said shell; attaching means connected to said shell; a screw having a generally spherical head within the interior of said shell, with its shank extending through said opening and said hole, with one side of said shank cut away to form a flat bearing surface; a pin mounted in said supporting member and passing through a portion of said hole to bear against said flat bearing surface of said screw to prevent rotation of the latter; and a nut engaging said screw and bearing against said supporting member, operable to tension said screw to force said shell against said recess to hold said shell against movement with respect to said member, or to loosen said screw to permit rotation of said shell.

6. A camera supporting stand of the class described which includes: a base member; an upright mounted on said base; a generally horizontally extending arm pivotally attached intermediate its ends to said upright for rotation about a generally horizontal axis; a projection extending from said upright in a direction generally parallel to and vertically aligned with said arm; a manually adjustable screw extending from a point in said arm adjacent one end thereof, into said projection, said screw cooperating with said arm and said projection to move said one end of said arm toward or away from said projection to thereby pivot said arm; and camera attaching means mounted on the opposite end of said arm adjacent the free end thereof, said means being rotatable about the generally horizontal longitudinal axis of said arm, about a generally horizontal axis perpendicular to the said longitudinal axis of said arm, and about a generally vertical axis.

7. A camera supporting stand of the class described which includes: a base member; an upright mounted on said base; a generally horizontally extending arm pivotally connected to said upright for rotation about a generally horizontal axis, the point of pivotal connection being closer to one end of said arm than the other, whereby said arm has a longer and a shorter end; a projection extending from said upright in a direction generally parallel to said shorter end of said arm and aligned therewith but vertically separated therefrom; a manually adjustable screw extending between said projection and the shorter end of said arm, operable to rotate said arm about its point of pivotal connection to said upright; and camera attaching means mounted on the longer end of said arm adjacent the free end thereof, said means being rotatable about the generally horizontal longitudinal axis of said arm, about a generally horizontal axis perpendicular to the said longitudinal axis of said arm, and about a generally vertical axis.

SAMUEL NAGOURNEY.

REFERENCES CITED

The following references are of record in the file of this patent:

UNITED STATES PATENTS

| Number | Name | Date |
| --- | --- | --- |
| 696,167 | Forester | Mar. 25, 1902 |
| 718,445 | Fliehmann | Jan. 13, 1903 |
| 719,574 | Fergusson | Feb. 3, 1903 |
| 856,610 | Steindorf | Jan. 11, 1907 |
| 960,723 | Smith | June 7, 1910 |
| 1,154,904 | Bain | Sept. 28, 1915 |
| 1,280,013 | Goddard | Sept. 24, 1918 |
| 1,711,768 | Bausch et al. | May 7, 1929 |
| 2,442,736 | Valentine | June 1, 1948 |

FOREIGN PATENTS

| Number | Country | Date |
| --- | --- | --- |
| 376,971 | Germany | June 8, 1923 |